United States Patent [19]

Wagner

[11] Patent Number: 4,612,517
[45] Date of Patent: Sep. 16, 1986

[54] SIGNAL SIMULATOR FOR MAGNETIC RECORDING HEAD

[75] Inventor: Ronald H. Wagner, Fremont, Calif.

[73] Assignee: Memorex Corporation, Santa Clara, Calif.

[21] Appl. No.: 612,970

[22] Filed: May 23, 1984

[51] Int. Cl.[4] .......................................... H03B 25/00
[52] U.S. Cl. ........................................ 331/46; 331/2; 331/25; 331/56; 331/76
[58] Field of Search ................ 328/14, 28; 331/2, 17, 331/25, 46, 56, 76, 77

[56] References Cited

U.S. PATENT DOCUMENTS 4,259,744  3/1981  Junod et al. ..................... 331/2 X Primary Examiner—Eugene R. LaRoche
Assistant Examiner—James C. Lee
Attorney, Agent, or Firm—John J. McCormack; Nathan Cass; David W. Heid

[57] ABSTRACT

Disclosed is equipment for testing a magnetic recording head; comprising a circuit which generates a test signal simulating what the head under test would generate.

60 Claims, 12 Drawing Figures

BLOCK DIAGRAM, HEAD SIGNAL SIMULATOR.

HD "0" 3.0 MHZ INNER RADIUS.

HD "0" 3.0 OUTER RADIUS.

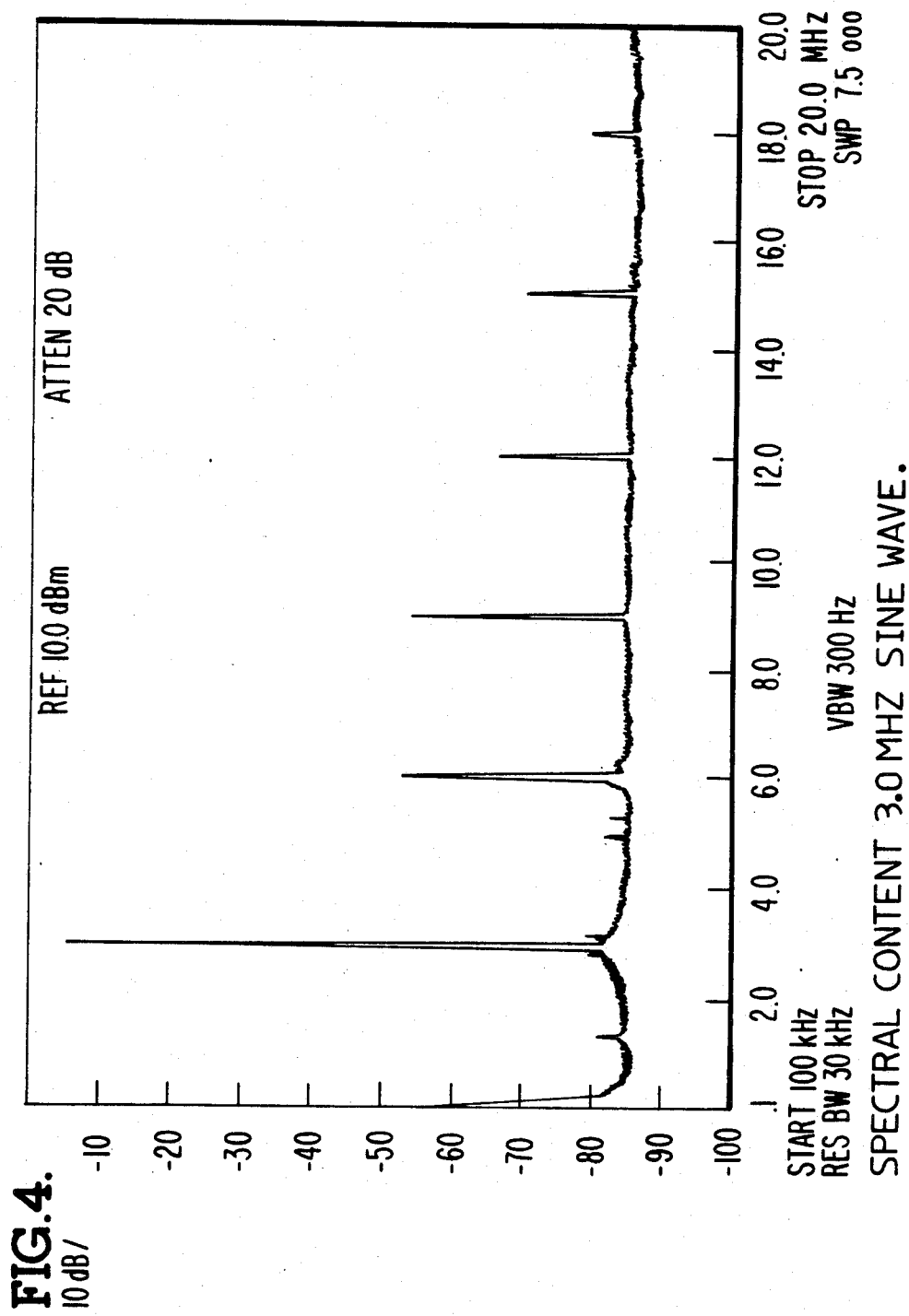

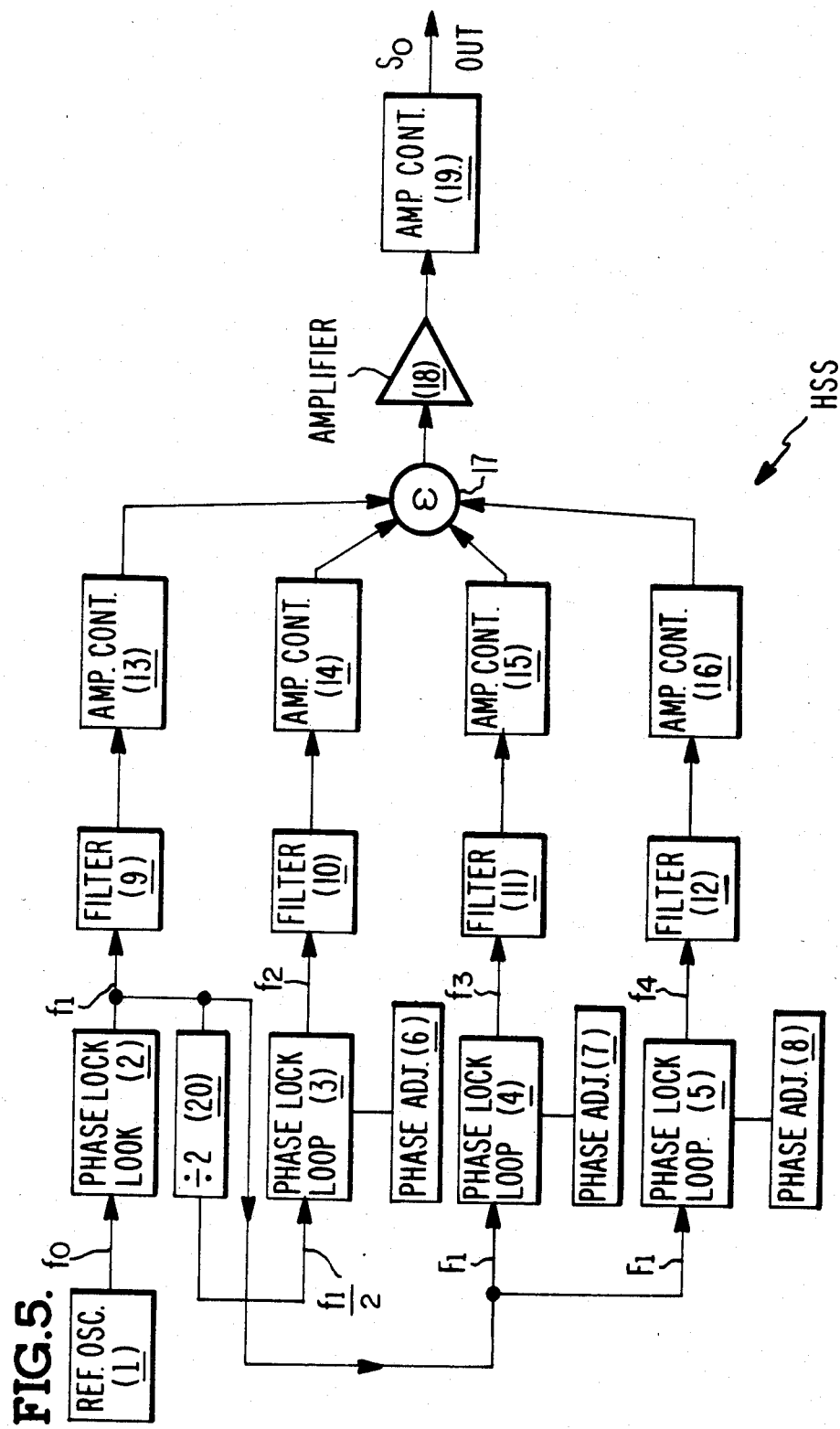

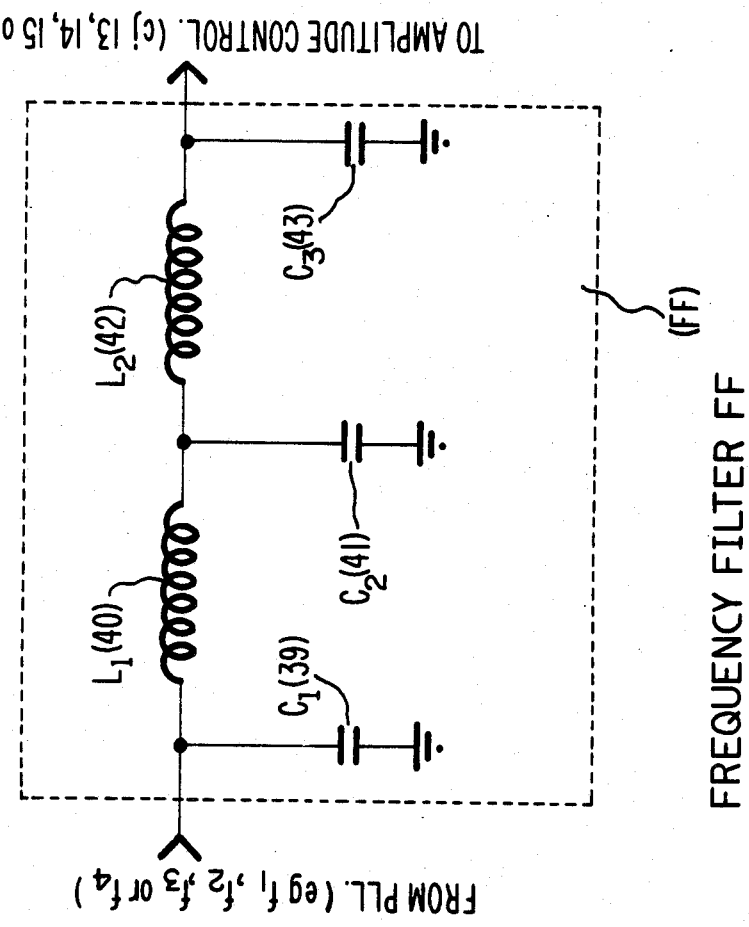
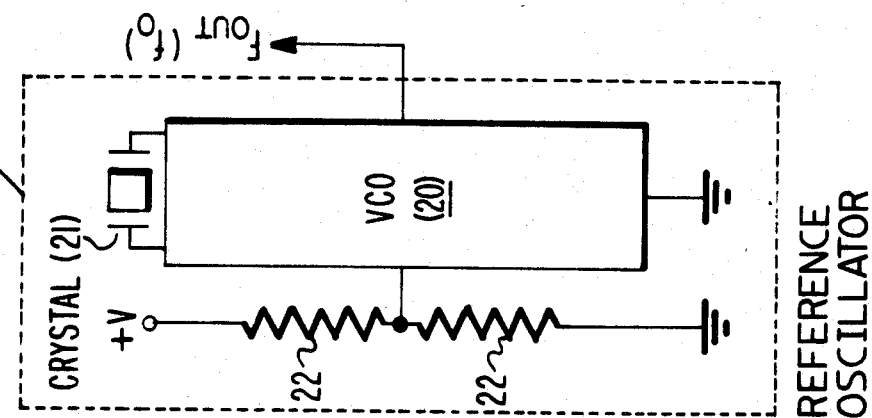

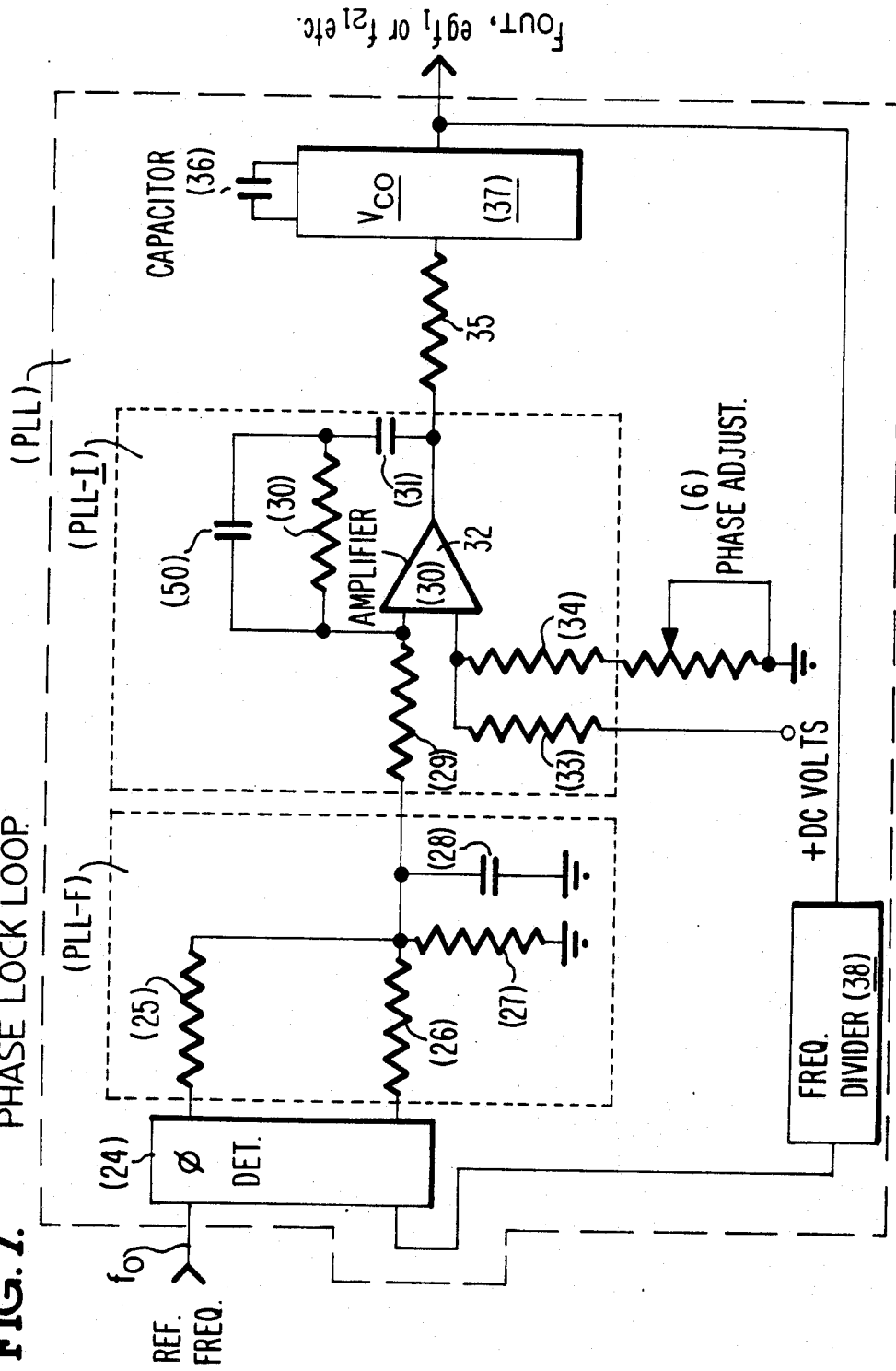
FIG. 7. PHASE LOCK LOOP.

SUMMING POINT AND MASTER GAIN CONTROL.

ELECTRICAL OUTPUT OF HEAD SIGNAL SIMULATOR.
[HSS]

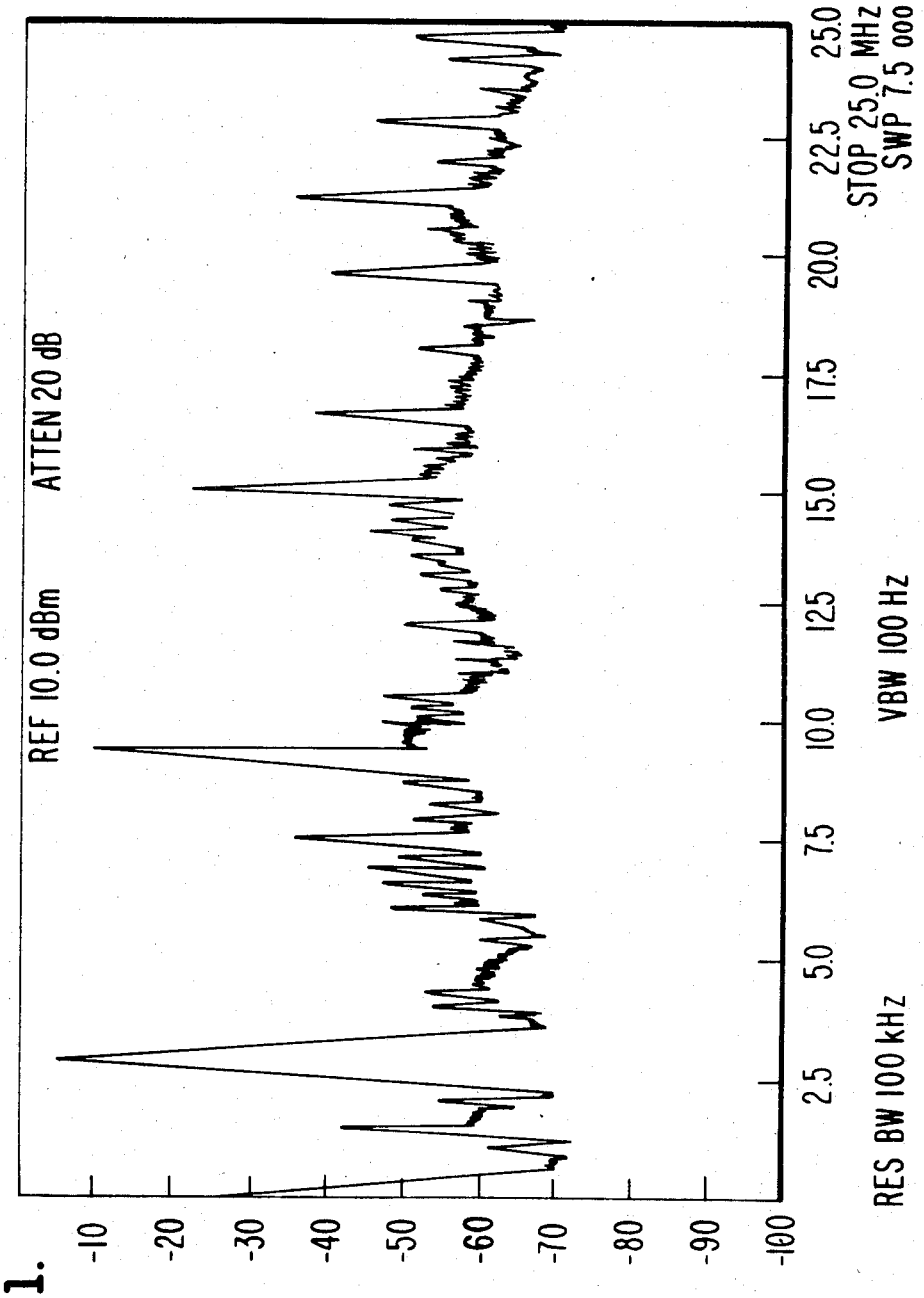

SIGNAL SIMULATOR FOR MAGNETIC RECORDING HEAD

This invention concerns equipment for testing a magnetic recording head; and, more particularly, a circuit for generating a signal which, when viewed on an oscilloscope or spectrum analyzer, simulates the signal that would be generated from the head.

BACKGROUND, FEATURES

Prior to this invention, the only way that the performance of a "read circuit" for a magnetic recording data channel could be tested was either with a sine wave oscillator, or else with output from the actual head flying over a ("written") disk. Both of these methods have disadvantages, as workers know.

1. If a sine wave oscillator is used to test a "read circuit", the circuit may respond differently to the "head signal" than it does to the sine wave. This is because a head signal consists of a series of positive-going and negative-going pulses which have many harmonic components. FIGS. 1A and 1B are (oscilloscope) photographs of head signals typical of such instances. The two photos show the differences in readback wave forms that are solely due to the radial head position over the disk.

FIGS. 2 and 3 show the spectral content of these signals (taken at the inner and outer radius, resp., on a "test disk"). The vertical spikes represent the "fundamental" and its associated harmonics. The large spike at the left (about 2.8 MHz) is the fundamental and the harmonics shown are the 2nd, 3rd, 4th, 5th, 6th and 7th, etc. As a comparison, FIG. 4 shows the spectral content of a 3.0 MHz sine wave signal. Because it does not contain the same harmonics as the head signal, the circuit under test is not required to operate successfully over the bandwidth that is needed to handle actual waveforms.

2. The disadvantages to using an actual head and disk are many. First, and most important, is availability; for new technologies, the heads and/or disks may not exist at the time that the "read channel" development should take place. Furthermore, the heads and disks that may be available during read channel development may not be appropriate for their intended use. When this happens, the read channel may have to be continually modified during evolution of the head or disk technology.

INVENTION FEATURE

In the method I propose, no head or disk are involved. The "evaluation wave form" is created electronically and is synthesized in such a way that its spectral content, and amplitudes, can be made equal to any desired waveform. This ability to vary the amplitude and the spectral content of an input waveform gives one a tool with which one can probe the overall effect of the circuit under test to variations in the waveform. Since no head and disk are needed, availability of heads and/or disks is not a problem; and circuit development can be undertaken in parallel with head and disk development (rather than waiting for these components to arrive).

OBJECTS

It is an object hereof to provide (at least some of) the here-mentioned features and advantages. Another object is to provide such in a signal simulator for magnetic recording heads. A further object is to teach such in a frequency generator circuit to synthesize an analog readback waveform, such as expected from a magnetic recording head reading on a disk. Another object is to teach such wherein a key circuit element comprises at least one of the following:

a reference oscillator which excites a plurality of phase-locked loops;

a phase-locked loop for the waveform fundamental, together with its own bandwidth and amplitude control; (or a plurality of phase-locked loops, each with amplitude, bandwidth and phase controls);

a summing circuit for the outputs of the phase-locked loops; and amplification for the resultant waveform.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements:

FIGS. 1A, 1B depict typical read-back waveforms from a prescribed magnetic recording head, while FIG. 4 depicts the spectral content of a 3 MHz sine wave, for comparison;

FIG. 5 is a block diagram of a "head signal simulator" embodiment;

FIG. 6 shows a preferred "reference oscillator" therefor;

FIG. 7 shows a preferred "phase lock loop" therefor;

FIG. 8 shows a preferred "frequency filter" therefor;

DESCRIPTION OF THE PREFERRED EMBODIMENT

General Description, Background

Figure 1A:
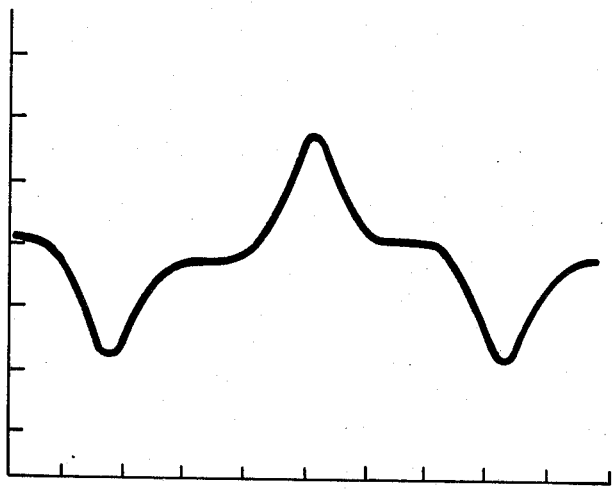

FIG. 5 schematically illustrates a block diagram of a preferred "head signal simulator" constructed according to principles of this invention. This, and other means discussed herein, will generally be understood as constructed and operating as presently known in the art, except where otherwise specified. And, except as otherwise specified, all materials, methods and devices and apparatus herein will be understood as implemented by known expedients according to present good practice.

"Head signal simulator" (FIG. 5)

In the FIG. 5 block diagram of the preferred head signal simulator HSS, a reference oscillator #1 is provided. The signal obtained from oscillator #1 is connected to a phase-lock loop (item 2). The output of item 2 is either directly used as the reference input to other phase-locked loops (PLL items 4 and 5) or it is connected to a frequency divider (item 49) whose output then becomes the reference input for the other phase-locked loops (item 3).

Although only four PLL's are shown in this illustration, it should be understood that this technique could be extended to include any number of such circuits, so that virtually any desired waveform may be generated.

Each of the phase-lock loops (2, 3, 4, 5) has an output frequency ($f_1$, $f_2$, $f_3$, $f_4$) which is a multiple of its reference oscillator frequency (f(0), f(1) or f(½) ) and corresponds to the fundamental or one of the harmonics of the desired head signal. The phase lock loop stage 2 represents the fundamental frequency $f_1$ of the head signal. The output of this circuit is also connected to a filter 9, and then to an amplitude control device 13. The output of amplitude control device 13 is connected to a summing network 17, which is inputted to an amplifier 18, and then to a master gain control 19.

A duplicate of this "$f_1$ signal path" is provided for each harmonic ($f_2$, $f_3$, $f_4$, etc.). In addition to the components used in the fundamental signal path (for $f_1$), the PLL for each of the harmonics also contains phase adjustment means (cf. items 6, 7 and 8 for $f_2$, $f_3$, $f_4$, resp.). The purpose of this adjustment is to shift the phase of its phase-lock loop output signal without changing its frequency. When each of the harmonic signals is connected (via resp. filter and Amp.) to the summing network 17 and Amplifier 18, the output will closely resemble the desired "head signal" (see waveform in FIG. 10). It will be understood that this will involve the proper amplitude adjustments and controls (cf. stages 13, 14, 15 and 16) and the proper phase adjustments, controls (cf. stages 6, 7, 8). That is, the output of the output-amplifier stage 18 will be a signal that closely simulates the desired head signal as in FIG. 10. The amplitude control stage 19, will be understood as used to set the overall output signal level ($S_o$).

To summarize, the FIG. 5 system HSS will be seen as teaching a frequency generator circuit apt for synthesizing an analog readback waveform, such as expected from a magnetic recording head reading on a disk. Workers will recognize that among the important circuit elements are: a reference oscillator which excites a plurality of phase-locked loops (e.g., cf. FIG. 6); a phase-locked loop for the waveform fundamental, together with its own bandwidth and amplitude control (e.g., cf. FIG. 7); and a plurality of phase-locked loops for each desired "harmonic", each loop with amplitude, bandwidth and phase controls (e.g., cf. filter in FIG. 8); plus a summing circuit for the outputs of all phase-locked loops (e.g., cf. FIG. 9), with amplification for the resultant output waveform.

Reference oscillator (FIG. 6):

It should be recognized that there are many ways of making a suitable reference oscillator (cf. 1, FIG. 5). FIG. 6 depicts a preferred implementation of this function, wherein a voltage controlled oscillator (VCO), 20, is used as the oscillator element, with a crystal 21 coupled thereto. (Normally, more conventional circuits of this type will use a capacitor in place of the crystal 21.) Two resistors (22 and 23) are coupled at the input to set the control voltage (+V) to some nominal fixed value. The output frequency $f_o$ here will be the crystal frequency. It will be recognized that a higher-frequency source may be used, and divided, to give a lesser reference frequency.

Phase-Lock Loop (FIG. 7)

A preferred phase-lock loop embodiment PLL is shown in FIG. 7. Stage PLL is representative of like stages 2, 3, 4, 5 and consists of a phase detector 24, a filter circuit PLL-F, integrator, PLL-I, oscillator, VCO, frequency divider 38, and phase adjuster 6.

When there is a difference in phase between the reference input and the output of the divider, the phase detector output will comprise a series of pulses. These pulses must be filtered so that the input to the VCO 37 is a D.C. signal. One filter PLL-F consists of resistors (25, 26 and 27), as well as a capacitor (28). The purpose of filter PLL-F is to eliminate any high frequency noise, or spikes, which may also appear on the output of the phase detector.

The integrator PLL-I consists of resistors 29, 30, 33, 35, capacitors 31, 50 and amplifier 32. The purpose of the integrator is to amplify and further filter the output of the phase detector 24 so that a clean D.C. signal is presented to the input of the VCO (37). In addition to the above-mentioned components, each of the phase-lock loops PLL which generate the harmonic signals (see FIG. 5, #3, 4, 5) have a phase adjustment potentiometer (see items 6, 7, 8, resp.). The phase adjustment potentiometers provide a means of timeshifting each of the harmonic outputs as referenced to the fundamental.

The voltage controlled oscillator 37 converts the D.C. input from the integrator PLL-I to an output frequency (e.g., $f_1$, $f_2$, $f_3$, $f_4$). This frequency is a function of the D.C. voltage and of the capacitance of capacitor 36. Capacitor 36 determines the basic output frequency, while the D.C. voltage adjusts the output frequency so that any errors that exist between the reference frequency $f_o$ and the VCO output are minimized. To achieve this comparison, the VCO output is divided-down by the frequency divider stage 38. The output of the divider 38 is the same frequency as the reference frequency.

The output waveform of the phase-locked oscillator PLL is a square wave which contains many harmonics. These harmonics must be significantly reduced so that they do not affect the required ultimate wave form of the ultimate output $S_o$ (FIG. 5).

Filter (FIG. 8)

The preferred filter embodiment FF is given in FIG. 8. Filter FF (representative of filters 9, 10, 11, 12, FIG. 5) consists of inductors 40, 42, coupled to ground via capacitors 39, 41, 43. The filter components are chosen so that harmonics of the input frequency are less than −50 db below the fundamental. In the event that another type of oscillator is used which already produces a sine wave, it should be apparent that the filters FF would not be required. The filters FF (one for each frequency) are each, in turn, inputted to a respective potentiometer (13, 14, 15 or 16; see FIG. 5) which is used to set the amplitude of that particular signal.

Figure 9:
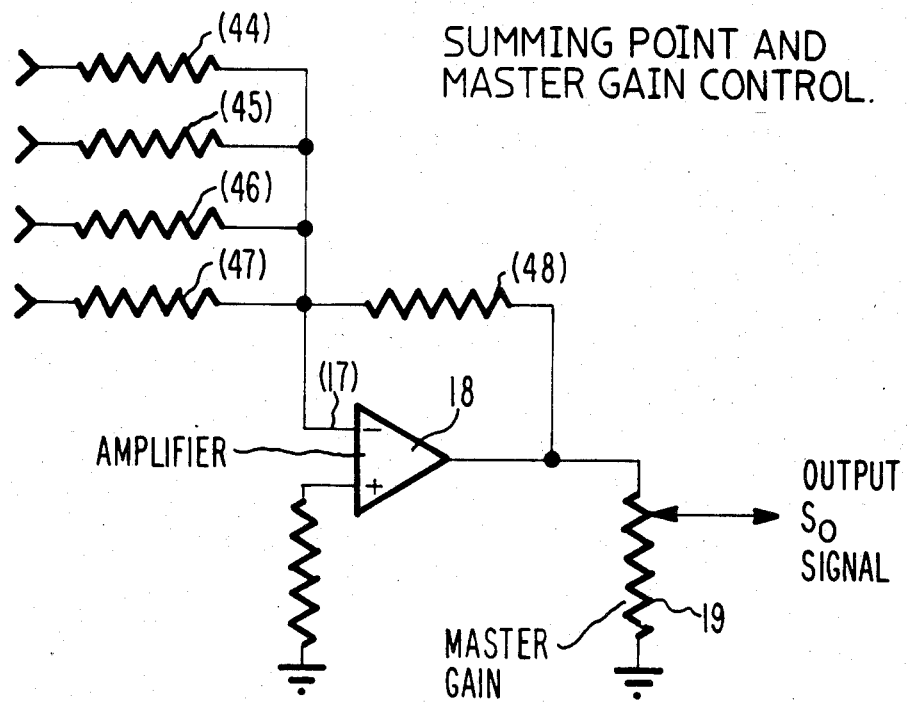
FIG. 9 shows a preferred "summing amplifier" therefor; the output thereof being depicted in FIG. 10, and the spectral content of this output shown in FIG. 11.

Summing Point, Master Gain Control (FIG. 9)

The output of the potentiometers is connected to a summing amplifier 17, a preferred form of which, SP, is shown in FIG. 9. The outputs of potentiometers 13, 14, 15 and 16 are each connected, via respective input resistor 44, 45, 46 and 47, to the amplifier 18, a wide band video amplifier. Amplifier 18 is inputted to a "Master Gain" potentiometer 19, whose output is the composite head signal $S_o$ (see FIG. 5). The amplitude of the output $S_o$ is determined by the setting of this potentiometer 19.

Figure 10:
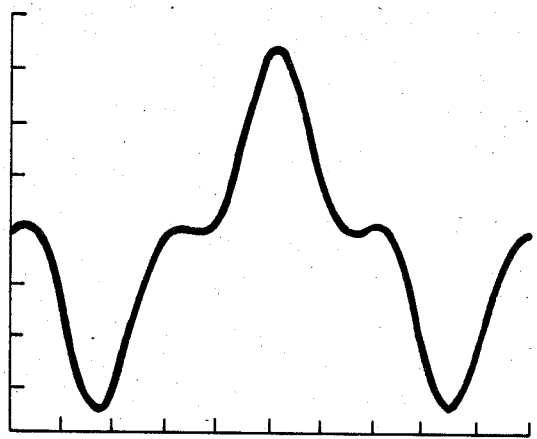

Output waveform, $S_o$ (FIGS. 10, 11)

Figure 1B:
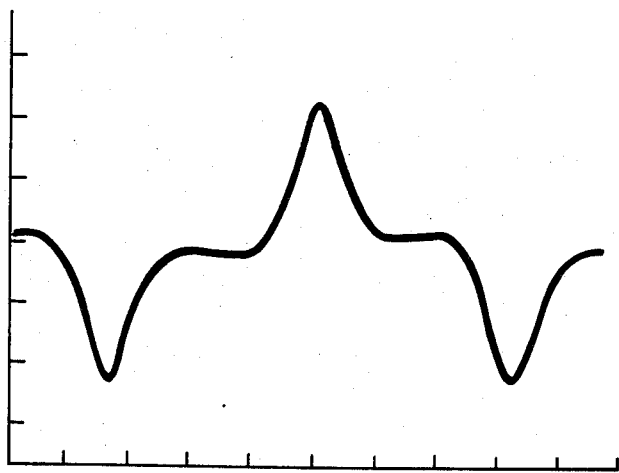
Figure 2:
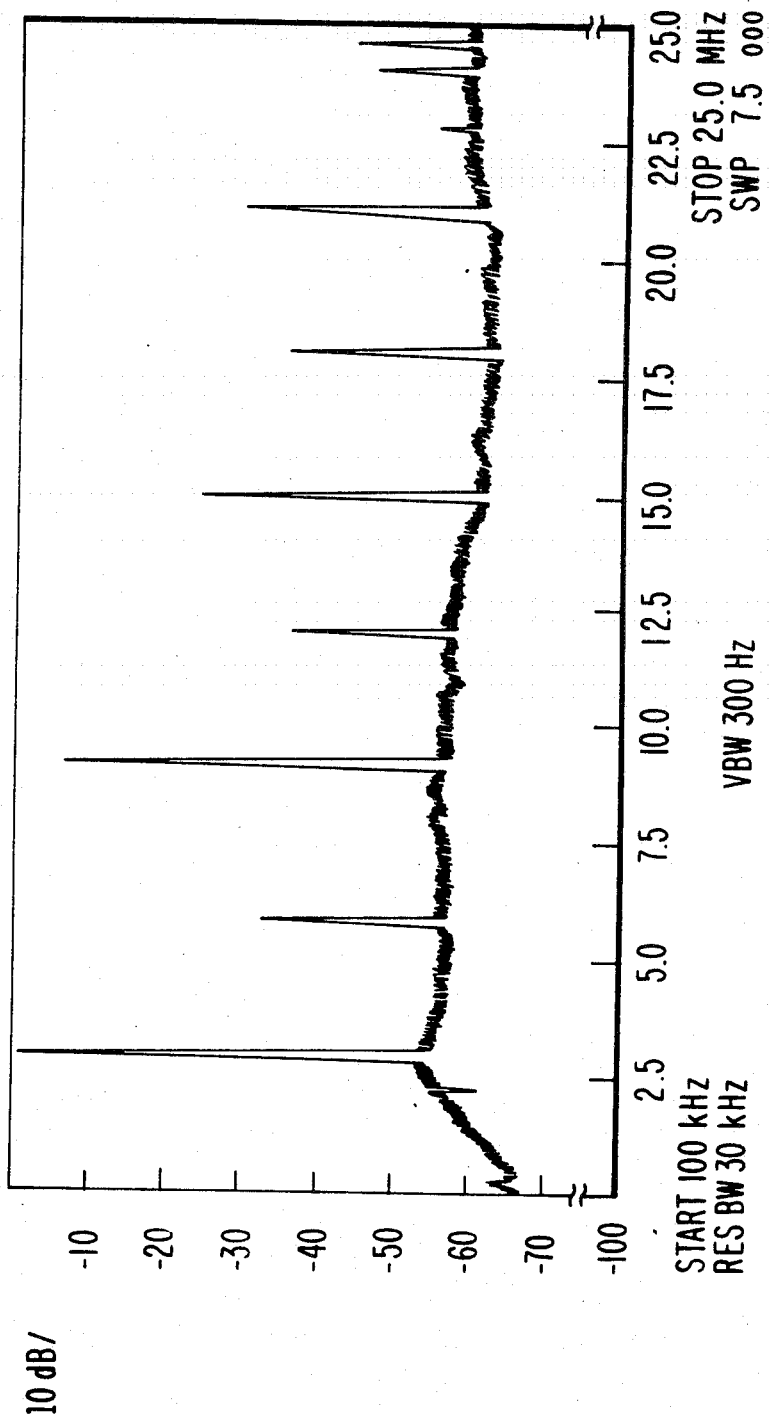
FIGS. 2 and 3 depict the spectral content, respectively, of each
Figure 3:
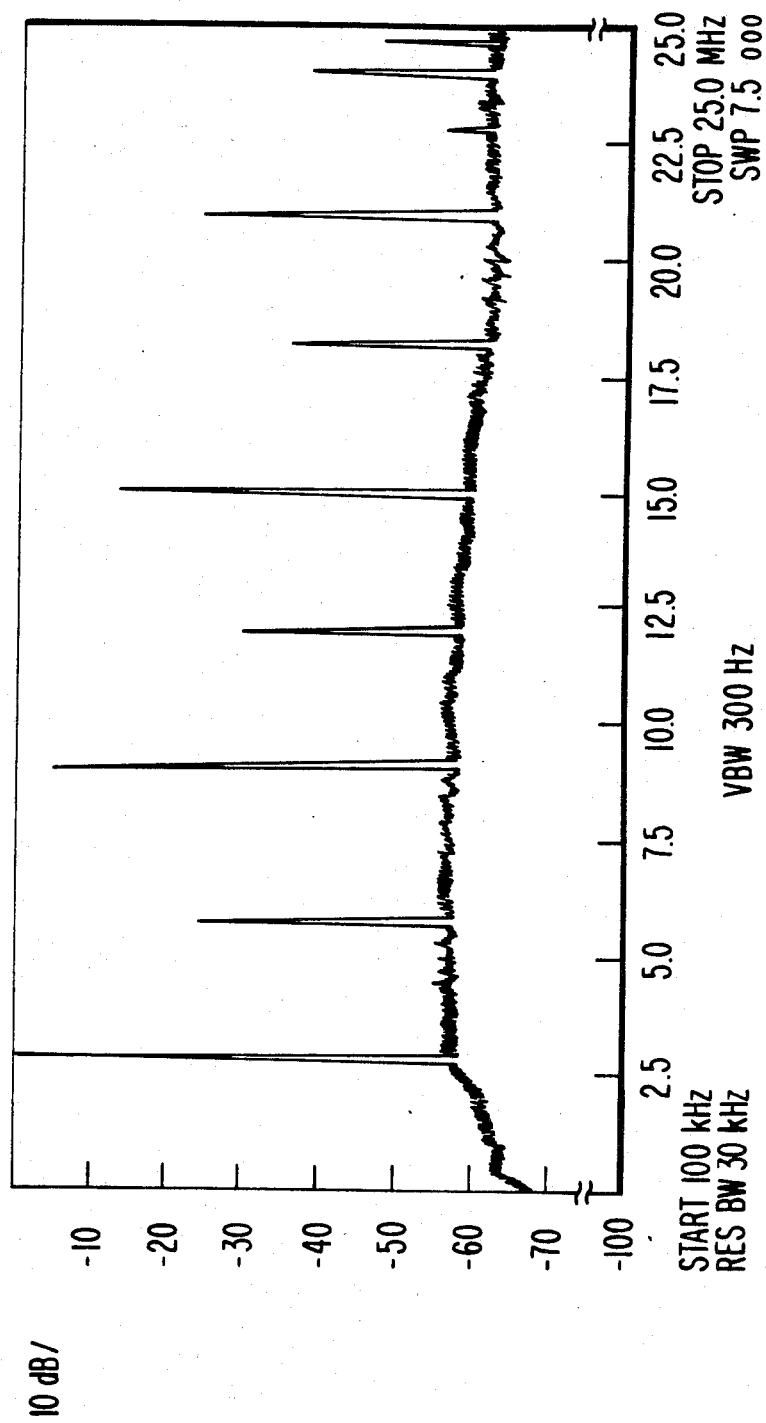

The signal $S_o$ that is obtained at the output of the potentiometer 19 is shown in FIG. 10 (typical form). The typical spectral content of this signal $S_o$ is given in FIG. 11. When these two figures are compared with FIGS. 1, 2 and 3, it will be recognized that this Head Signal Simulator HSS provides a duplicate of the head/disk signal. Of course, if one shifts the potentiometers 6, 7 or 8 (to adjust phase) or 13, 14, 15 or 16 (to adjust amplitude), the waveform of output $S_o$ (FIG. 10) will be altered to reflect this.

Conclusion

Workers will appreciate that the foregoing (FIG. 5) teaches a head signal simulator HSS apt for generating a signal which, when viewed on an oscilloscope or spectrum analyzer, duplicates the type of signal that would be obtained from a magnetic recording head which is reading information from a magnetic medium, such as a disk. Workers will appreciate that other like simulators also lie within the scope of this teaching. And, while FIGS. 6-9 teach preferred elements of such a system, other like "reference oscillators", and/or "phase-lock loop" circuits, and/or "frequency filters" and/or "summing/gain control" circuits may be employed to so simulate such head signals.

Now, workers will recognize that most, if not all, of the elements of such an HSS system are known in one form or another (though not used as in the instant combination—e.g., see U.S. Pat. Nos. 3,375,463; 3,283,260; 3,227,963 and 3,300,731 concerning the use of various "phase-locked loop" circuits; while U.S. Pat. Nos. 3,696,307; 4,227,158 and 3,328,717 teach the use of oscillator output for other situations).

Thus, it will be understood that the preferred embodiments described herein are only exemplary, and that the invention is capable of many modifications and variations in construction, arrangement and use without departing from the spirit of the invention.

And workers will appreciate that further modifications of the invention are also possible. For example, the means and methods disclosed herein are also applicable to tape systems and the like, as well as to drums, etc. Also, the present invention is applicable for providing the transducer signal simulation desired with other forms of recording and/or reproducing systems.

The above examples of possible variations of the present invention are merely illustrative. Accordingly, the present invention is to be considered as including all possible modifications and variations coming within the scope of the invention as defined by the appended claims.

What is claimed is:

1. A head signal simulator for generating simulated signals $S_o$ from a magnetic recording head without use of the head or associated media, wherein the signals $S_o$ can be readily varied in amplitude and frequency-content to synthesize various head-readback waveforms, this simulator comprising:
reference oscillator means inputted to a plurality of prescribed phase-lock loop circuits, one such circuit for a prescribed waveform fundamental and one or more other phase-lock loop circuits, each such circuit corresponding to a different harmonic;
summing means inputted from all the said phase-locked loop circuits; and
output means inputted by said summing means and adapted to present the desired output waveform $S_o$.

2. The combination as recited in claim 1 where each loop circuit includes bandwidth and amplitude control means, whereby a prescribed spectral content and amplitudes of the waveform is generated.

3. The combination as recited in claim 2 where the output means is adapted to provide amplification.

4. The combination as recited in claim 3 where each phase-locked loop circuit is inputted to a respective filter-amplitude control means which, in turn, is inputted to said summing means.

5. The combination as recited in claim 4 where the loop circuits for said harmonics are each adapted to include phase-adjust means.

6. The combination as recited in claim 5 where said phase-adjust means comprise adjustable-impedance means.

7. The combination as recited in claim 5 wherein the filter-amplifying means each comprise a prescribed frequency filter and associated adjustable-impedance means, giving the desired output harmonic frequency and amplitude.

8. The combination as recited in claim 5 wherein the summing means comprises a summing network of impedances and is inputted to an output amplifier stage.

9. The combination as recited in claim 8 wherein the output amplifier stage is gain-controlled by associated output-gain means.

10. The combination as recited in claim 9 where the output gain means comprises adjustable-impedance means.

11. The combination as recited in claim 5 wherein the reference oscillator means comprises a voltage-controlled oscillator means.

12. The combination as recited in claim 11 wherein the VCO oscillator means includes control-impedance means and capacitor means.

13. The combination as recited in claim 5 where each loop circuit comprises a phase detect means, coupled to an associated V-C oscillator stage.

14. The combination as recited in claim 13 wherein each loop circuit also includes frequency-divider means.

15. The combination as recited in claim 14 where each loop circuit also includes a filter circuit to eliminate noise spikes.

16. The combination as recited in claim 15 where each loop circuit also includes integrator means coupled between the detector and the oscillator stage and adapted to filter and amplify detector output.

17. The combination as recited in claim 16 where the harmonic phase-adjust means each comprise a phase-adjusting potentiometer.

18. A method wherein a head signal simulator for generating simulated signals $S_o$ typifying those from a prescribed magnetic recording head as read-back from a prescribed medium, without use of the head or associated media, wherein the signals $S_o$ can be readily varied in amplitude and frequency-content to synthesize various head-readback "evaluation waveforms", this simulator comprising:
reference oscillator means inputted to a plurality of prescribed phase-locked loop circuits, one such circuit for a prescribed waveform fundamental and one or more phase-lock loop circuits, each such circuit corresponding to a different harmonic thereof;
summing means inputted from all the said phase-locked loop circuits; and
output means inputted by said summing means and adapted to present the desired output waveform $S_o$.

19. The method of claim 18 including the step wherein each loop circuit is constructed to include bandwidth and amplitude control means.

20. The method of claim 19 including the step of adapting the output means to provide amplification.

21. The method of claim 18 including the step of arranging the oscillator means to include a VCO with a crystal means coupled thereto, to provide a reference frequency.

22. The method of claim 21 including the step of arranging each said loop circuit comprise phase detect means inputted to oscillator means via prescribed filter means.

23. The method of claim 22 including the step of providing frequency divider means coupled across the loop circuit and the step of arranging oscillator means to include capacitive means for determining basic output frequency.

24. The method of claim 23 including the step of adapting the filter means to comprise an R-C filter circuit and amplifier means.

25. The method of claim 24 including the step of arranging each loop circuit for a harmonic to also include phase-adjusting variable impedance means.

26. The method of claim 22 including the step of adapting the reference oscillator means to generate asymmetric, "non-Sinewave" output, and the step of providing wave-filter means between each loop circuit and the summing means.

27. The method of claim 26 including the step of arranging each said wave-filter means to comprise inductor means coupled capacitively to ground.

28. The method of claim 21 including the step of arranging each loop circuit to be so-inputted to the summing means via a respective amplitude control means.

29. The method of claim 28 including the step of adapting the summing means to comprise an output amplifier stage adapted to accommodate the subject bandwidth, this stage being inputted to a variable-impedance "master gain stage" adapted to set the amplitude of output waveform $S_o$.

30. The method of claim 29 including the step of adopting the respective amplitude control means and the "master gain stage" each comprise a suitable potentiometer.

31. A head signal simulator for generating simulated signals $S_o$ from a magnetic recording head without use of the head or associated media, wherein the signals $S_o$ can be readily varied in amplitude and frequency-content to synthesize various head-readback waveforms, this simulator comprising:
reference oscillator means inputted to a PLL stage, this stage comprising at least one phase-lock loop circuit selected from the group consisting of: a phase-lock loop circuit corresponding to a prescribed "waveform fundamental" and a number of phase-lock loop circuits, each corresponding to a different corresponding "harmonic",
summing means inputted from the phase-locked loop stage; and
output means inputted by said summing means and adapted to present the desired output waveform $S_o$.

32. The combination as recited in claim 31 where each loop circuit includes bandwidth and amplitude control means, whereby a prescribed spectral content and amplitudes of the waveform is generated.

33. The combination as recited in claim 32 where the output means is adpated to provide amplification.

34. The combination as recited in claim 33 where each phase-locked loop circuit is inputted to a respective filter-amplitude control means which, in turn, is inputted to said summing means.

35. The combination as recited in claim 33 where the loop circuits for each said harmonic is adapted to include phase-adjust means.

36. The combination as recited in claim 34 where said phase-adjust means comprise adjustable-impedance means.

37. The combination as recited in claim 35 wherein the summing means comprises a summing network of impedances and is inputted to an output amplifier stage.

38. The combination as recited in claim 37 wherein the output amplifier stage is gain-controlled by associated output-gain means.

39. The combination as recited in claim 38 where the output gain means comprises adjustable-impedance means.

40. The combination as recited in claim 35 wherein the reference oscillator means comprises a voltage-controlled oscillator means.

41. The combination as recited in claim 40 wherein the voltage controlled oscillator means includes control-impedance means and capacitor means.

42. The combination as recited in claim 35 where each loop circuit comprises a phase detect means, coupled to an associated V-C oscillator stage.

43. The combination as recited in claim 42 wherein each loop circuit also includes frequency-divider means.

44. The combination as recited in claim 43 where each loop circuit also includes a filter circuit to eliminate noise spikes.

45. The combination as recited in claim 44 where each loop circuit also includes integrator means coupled between each detector means and associated oscillator stage and adapted to filter and amplify detector output.

46. The combination as recited in claim 45 where the harmonic phase-adjust means each comprise a phase-adjusting potentiometer.

47. A method of providing a head signal simulator for generating simulat.de signals $S_o$ typing those from a prescribed magnetic recording head as read-back from a prescribed medium, without use of the head or associated media, wherein the signals $S_o$ can be readily varied in amplitude and frequency-content to synthesize various head-readback "evaluation waveforms", this method comprising:
providing reference oscillator means inputted to a PLL stage, this stage being arranged to comprise one or more Phase-locked loop circuits, selected from the group consisting of: a phase-lock loop circuit corresponding to a prescribed "waveform fundamental" and a number of phase-lock loop circuits each corresponding to a different corresponding "harmonic",
inputting all the said phase-locked loop circuits to associated summing means; and
coupling said summing means to associated output means adapted to present the desired output waveform $S_o$.

48. The method of claim 47 including the step of arranging each loop circuit to include bandwidth and amplitude control means.

49. The method of claim 48 including the step of adapting the output means is provided amplification.

50. The method of claim 47 including the step of adapting the oscillator means to include a voltage-controlled oscillator with a crystal means coupled thereto, to provide a reference frequency.

51. The method of claim 50 including the step of arranging each said loop circuit to comprise phase detect means inputted to its associated oscillator means via prescribed filter means.

52. The method of claim 51 including the step of coupling frequency divider means across the loop circuit and the step of arranging the oscillator means to include capacitive means for determining basic output frequency.

53. The method of claim 52 including the step of arranging the filter means to comprise an R-C filter circuit and amplifier means.

54. The method of claim 53 including the step of arranging each loop circuit for a harmonic to also include phase-adjusting variable impedance means.

55. The method of claim 51 including the step of adapting the reference oscillator means to generate asymmetric, "non-Sinewave" output, and the step of providing wave-filter means between each loop circuit and the summing means.

56. The method of claim 55 including the step of adapting each said wave-filter means to comprise inductor means coupled capacitively to ground.

57. The method of claim 50 including the step of so-inputting each loop circuit to the summing means via a respective amplitude control means.

58. The metnod of claim 57 including the step of arranging the summing means comprise an output amplifier stage adapted to accommodate the subject bandwidth, this stage being inputted to a variable-impedance "master gain stage" adapted to set the amplitude of output waveform $S_o$.

59. The method of claim 58 including the step of arranging the respective preamplifier means and the "master gain stage" to each comprise a suitable potentiometer.

60. The combination as recited in claim 34 wherein each filter-amplitude control means to comprises a prescribed frequency filter and associated adjustable-impedance means, giving the desired output harmonic frequency and amplitude.

* * * * *

UNITED STATES PATENT AND TRADEMARK OFFICE
CERTIFICATE OF CORRECTION

PATENT NO. : 4,612,517

DATED : September 16, 1986

INVENTOR(S) : Ronald H. Wagner

It is certified that error appears in the above-identified patent and that said Letters Patent is hereby corrected as shown below:

```
Col.  6, line 63, delete "thereof;".
Col.  7, line 11, after "circuit" insert --to--;
         line 44, change "adopting" to --adapting--;
         line 45, after "each" insert --to--.
Col.  8, line  2, change "adpated" to --adapted";
         line 45, change "simulat.de" to --simulated--;
                  change "typing" to --typifying".
Col. 10, line  2, change "tand" to --t and--;
         line  9, change "metnod" to --method--;
         line 10, after "means" insert --to--;
         line 20, delete "to".
```

Signed and Sealed this

Second Day of December, 1986

*Attest:*

DONALD J. QUIGG

*Attesting Officer*  *Commissioner of Patents and Trademarks*